United States Patent
Ohshitanai et al.

(10) Patent No.: US 10,122,954 B2
(45) Date of Patent: Nov. 6, 2018

(54) PHOTOELECTRIC CONVERSION APPARATUS, IMAGING SYSTEM, AND METHOD FOR DRIVING PHOTOELECTRIC CONVERSION APPARATUS

(71) Applicant: CANON KABUSHIKI KAISHA, Tokyo (JP)

(72) Inventors: Kazuki Ohshitanai, Kawasaki (JP); Yasuji Ikeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/081,496

(22) Filed: Mar. 25, 2016

(65) Prior Publication Data

US 2016/0286148 A1    Sep. 29, 2016

(30) Foreign Application Priority Data

Mar. 26, 2015    (JP) .................. 2015-065246

(51) Int. Cl.
*H01L 27/148*    (2006.01)
*H04N 5/378*    (2011.01)

(52) U.S. Cl.
CPC .................. *H04N 5/378* (2013.01)

(58) Field of Classification Search
CPC   H03F 3/45183; H04N 5/37455; H04N 5/378; H04N 5/235; H04N 5/365; H04N 5/3658; H04N 5/374; H04N 5/347; H04N 5/35563; H04N 5/3575; H04N 5/3742; H04N 5/37452
See application file for complete search history.

(56) References Cited

U.S. PATENT DOCUMENTS

2013/0153749 A1*  6/2013  Sakurai ............. H01L 27/14806
                                                                  250/208.1

FOREIGN PATENT DOCUMENTS

JP        2005-311487 A    11/2005

* cited by examiner

*Primary Examiner* — Twyler Haskins
*Assistant Examiner* — Carramah J Quiett
(74) *Attorney, Agent, or Firm* — Canon U.S.A., Inc. IP Division

(57) ABSTRACT

In a photoelectric conversion apparatus, the number of differential transistors in which ON states thereof overlap with one another is increased when the number of the amplification transistors in which ON states thereof overlap with one another is increased.

19 Claims, 10 Drawing Sheets

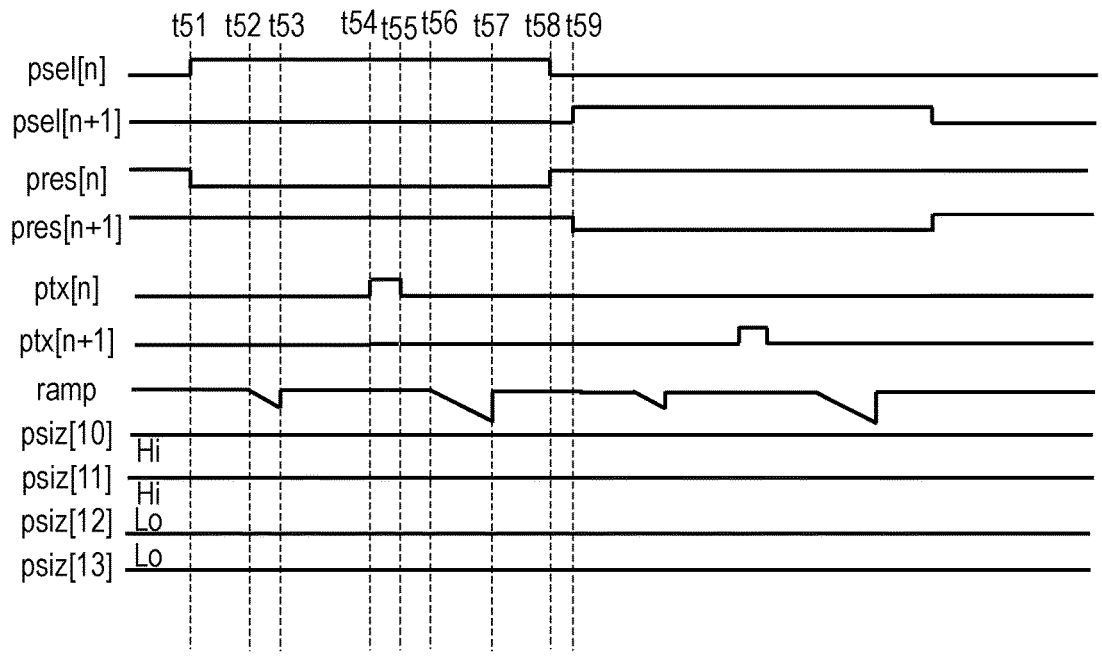
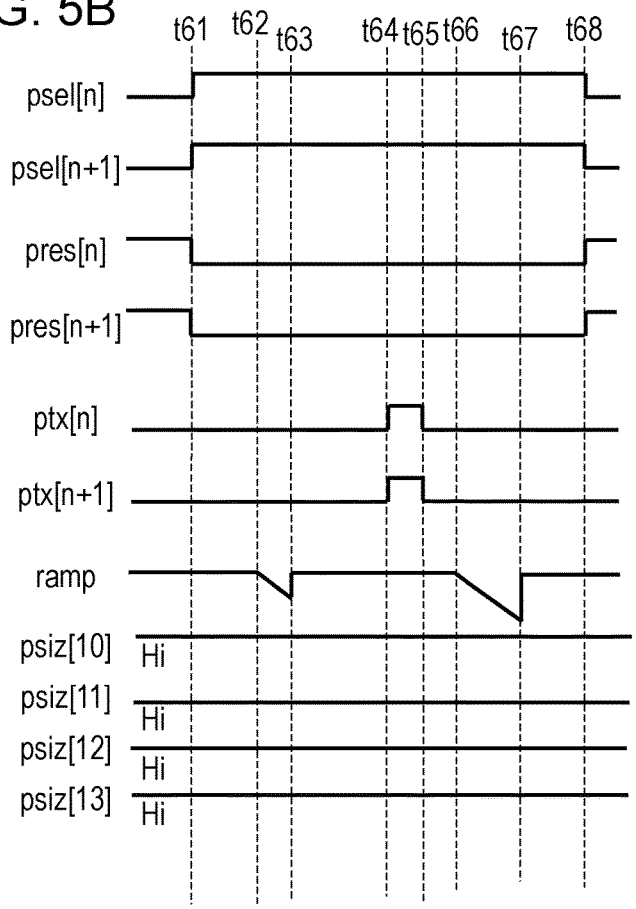

ing apparatus, and a method for driving
PHOTOELECTRIC CONVERSION APPARATUS, IMAGING SYSTEM, AND METHOD FOR DRIVING PHOTOELECTRIC CONVERSION APPARATUS

BACKGROUND

Field of the Disclosure

The present disclosure relates to a photoelectric conversion apparatus, an imaging system, and a method for driving the photoelectric conversion apparatus.

Description of the Related Art

Photoelectric conversion apparatuses including pixels and an AD conversion unit have been widely used.

Japanese Patent Laid-Open No. 2005-311487 discloses a photoelectric conversion apparatus including differential transistors which constitute differential pairs with amplification transistors of pixels.

SUMMARY

According to an embodiment of the present invention, there is provided a photoelectric conversion apparatus including a plurality of pixels each including a photoelectric conversion unit configured to generate a charge based on an incident light and an amplification transistor having a control node configured to receive the charge and to serve as a first input node of a differential pair, and a plurality of transistors having respective control nodes configured to receive a common potential. An operation of setting the control nodes of the plurality of transistors as a second input node of the differential pair while the plurality of transistors are in ON states and an operation of setting the control node of one of the plurality of transistors as a second input node while only one of the plurality of transistors is in an ON state are switched from one to another.

According to another embodiment of the present invention, there is provided a photoelectric conversion apparatus including a plurality of pixels each including a photoelectric conversion unit configured to generate a charge based on incident light, an amplification transistor having a control node configured to receive the charge and to serve as a first input node of a differential pair and a selection transistor, and a plurality of transistors having respective control nodes configured to receive a common potential, a switch, and a current source. The selection transistor is disposed in an electric path between the current source and the amplification transistor, and the switch is disposed in an electric path between the current source and one of the plurality of transistors.

According to a further embodiment of the present invention, there is provided a method for driving a photoelectric conversion apparatus including a plurality of pixels each including a photoelectric conversion unit configured to generate a charge and an amplification transistor having a control node configured to receive the charge and to serve as a first input node of a differential pair, and a plurality of transistors having respective control nodes which receive a potential in common. In a first operation, among the amplification transistors included in the plurality of pixels, at least one amplification transistor, that is, a first number of amplification transistors, is in an ON state for a first period, and among the plurality of transistors, at least one transistor, that is, a second number of transistors, is in an ON state for the first period and is set as a second input node of the differential pair. In a second operation, among the amplification transistors included in the plurality of pixels, a number of amplification transistors corresponding to a number larger than the first number, that is, a third number of application transistors, are in ON states for a second period, and among the plurality of transistors, a number of transistors corresponding to a number larger than the second number, that is, a fourth number of transistors, are in ON states for the second period and are set as the second input node of the differential pair.

Further features of the present invention will become apparent from the following description of exemplary embodiments with reference to the attached drawings.

BRIEF DESCRIPTION OF THE DRAWINGS

FIGS. 5A and 5B are diagrams illustrating an operation of the imaging apparatus.

DESCRIPTION OF THE EMBODIMENTS

Hereinafter, embodiments will be described with reference to the accompanying drawings. Note that an NMOS transistor and a PMOS transistor described in the embodiments may be appropriately replaced by a PMOS transistor and an NMOS transistor, respectively. In this case, and voltages applied to control nodes and main nodes of the transistors are also appropriately inverted.

First Embodiment

In a first embodiment, an imaging apparatus is illustrated as a photoelectric conversion apparatus.

Figure 1:
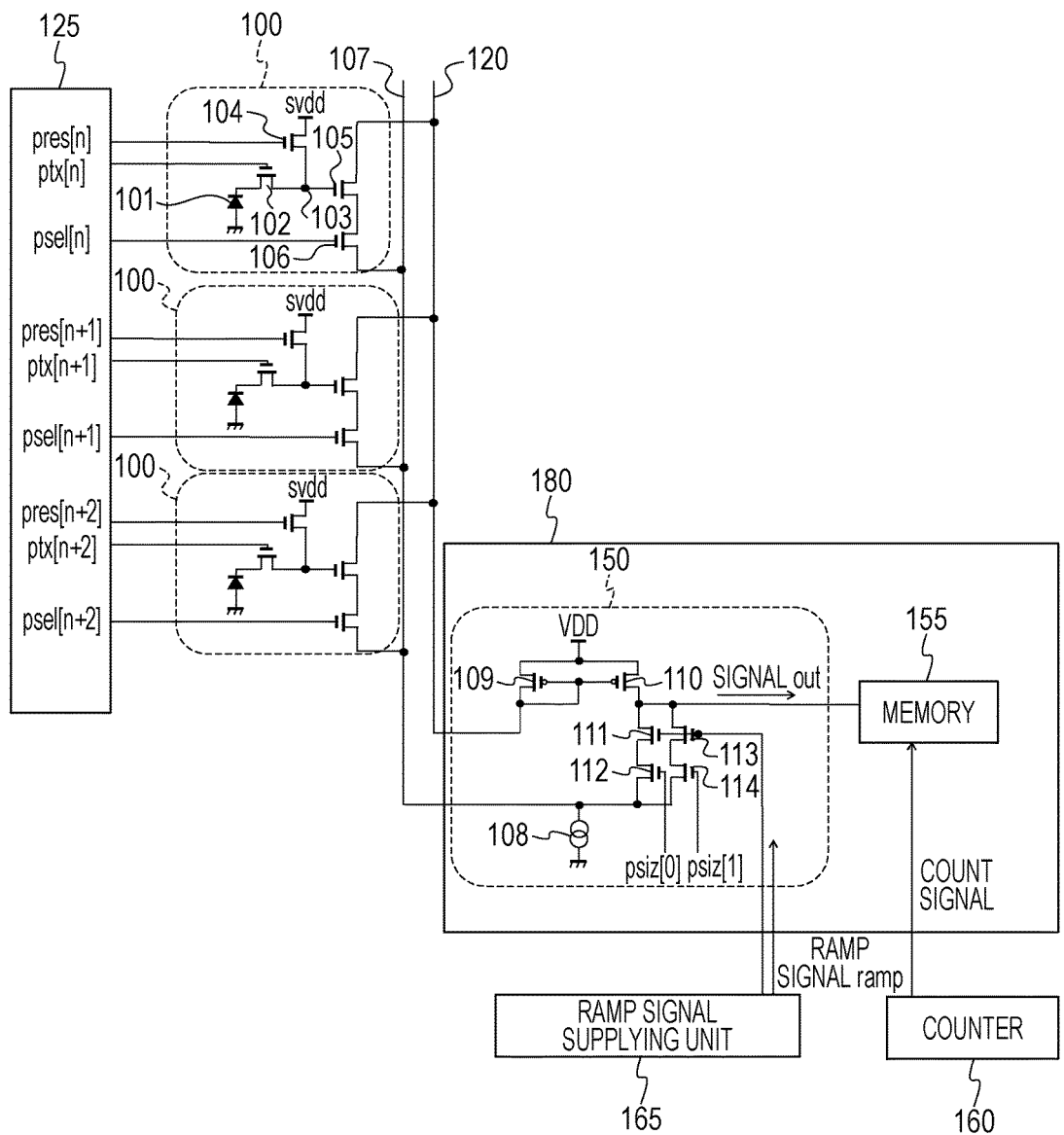
FIG. 1 is a diagram illustrating a configuration of an imaging apparatus.

FIG. 1 is a diagram illustrating an imaging apparatus including pixels 100, a vertical signal line 107, a connection line 120, a counter 160, a ramp signal supplying unit 165, and a column circuit unit 180 according to this embodiment. In FIG. 1, three pixels 100 arranged in an n-th row, an (n+1)-th row, and an (n+2)-th row are illustrated.

Each of the pixels 100 includes a photodiode 101 serving as a photoelectric conversion unit, a transfer transistor 102, a reset transistor 104, an amplification transistor 105, and a selection transistor 106. A floating diffusion unit 103 (hereinafter referred to as an "FD unit 103") serves as a control node of the amplification transistor 105. The transistors included in the pixels 100 are N-type MOS transistors.

A signal ptx[n] is supplied from a vertical scanning circuit 125 to the transfer transistor 102. Note that [n] denotes a row where a pixel 100 is positioned. The transfer transistor 102 has a first main node electrically connected to the photodiode 101 and a second main node electrically connected to the amplification transistor 105 through the FD unit 103.

A signal pres[n] is supplied from the vertical scanning circuit 125 to the reset transistor 104. The reset transistor 104 has a first main node to which a power source voltage svdd is supplied and a second main node electrically connected to the amplification transistor 105 through the FD unit 103.

The amplification transistor 105 has a first main node electrically connected to the connection line 120 and a second main node electrically connected to a first main node of the selection transistor 106.

A signal psel[n] is supplied from the vertical scanning circuit 125 to the selection transistor 106. The selection transistor 106 has a second main node electrically connected to the vertical signal line 107. The selection transistor 106 is disposed in an electric path between the amplification transistor 105 and the vertical signal line 107.

The selection transistors 106 of the plurality of pixels 100 are electrically connected to the vertical signal line 107 in common.

In this embodiment, the amplification transistors 105 included in the individual pixels 100 have the same channel width and the same channel length. Note that the term "channel width" represents a width of a strong inversion region generated below a gate at a time when a voltage is applied to the gate which is a control node so that a transistor is turned on. The term "width" corresponds to a length in a vertical direction relative to a direction in which a carrier moves in a plan view in which the transistor is viewed from a position above the gate. Furthermore, the term "channel length" represents a length of the strong inversion region generated below a gate at a time when a voltage is applied to the gate which is a control node so that a transistor is turned on. The term "length" corresponds to a length in the direction in which a carrier moves. Specifically, W/Ls which are channel ratios of the amplification transistors 105 included in the pixels 100 are equal to one another. Furthermore, the selection transistors 106 included in the individual pixels 100 have the same channel width and the same channel length. Specifically, W/Ls which are channel ratios of the selection transistors 106 included in the pixels 100 are equal to one another.

The column circuit unit 180 includes an output unit 150 and a memory 155. The output unit 150 includes a current source 108, a transistor 109, a transistor 110, a transistor 111, a switch transistor 112, a transistor 113, and a switch transistor 114. The transistors 109 and 110 are P-type MOS transistors and the other transistors are N-type MOS transistors. The switch transistor 112 is a first switch and the switch transistor 114 is a second switch.

A power source voltage VDD is supplied to the transistors 109 and 110. The transistors 109 and 110 constitute a current mirror circuit. Furthermore, the control node of the amplification transistor 105 corresponds to a first input node of a differential pair. A control node of one of the transistors 111 and 113 which is in an ON state corresponds to a second input node of the differential pair. The transistors 111 and 113 make a pair with the amplification transistor 105. Each of the transistors 111 and 113 is a differential transistor which makes a differential pair with the amplification transistor 105. In this embodiment, channel widths W of the amplification transistor 105, the transistor 111, and the transistor 113 are the same. Furthermore, channel lengths L of the amplification transistor 105, the transistor 111, and the transistor 113 are the same. Specifically, channel ratio W/L of the amplification transistor 105, the transistor 111, and the transistor 113 are the same.

Moreover, channel widths W of the selection transistor 106, the switch transistor 112, and the switch transistor 114 are the same. Channel lengths L of the selection transistor 106, the switch transistor 112, and the switch transistor 114 are also the same. Specifically, channel ratios W/L of the selection transistor 106, the switch transistor 112, and the switch transistor 114 are the same.

A ramp signal ramp is supplied from the ramp signal supplying unit 165 to control nodes of the transistors 111 and 113. A potential of the ramp signal ramp monotonically increase or monotonically decrease with time. A signal psiz[0] is supplied from a controller, not illustrated, to the switch transistor 112. A signal psiz[1] is supplied from the controller, not illustrated, to the switch transistor 114.

The vertical signal line 107 is electrically connected to the current source 108, the switch transistor 112, and the switch transistor 114.

The connection line 120 is electrically connected to the amplification transistors 105 in the pixels 100 in common. Furthermore, the connection line 120 is electrically connected to the transistors 109 and 110.

The output unit 150 serves as a comparison unit which outputs a signal out which is a result of comparison between signals supplied to the vertical signal line 107 and the ramp signal ramp. The signal out output from the output unit 150 is supplied to the memory 155. A count signal is supplied from the counter 160 which generates the count signal by counting a clock signal to the memory 155. The memory 155 stores the count signal obtained when a value of the signal out is changed. A plurality of memories 155 are disposed so as to correspond to columns of the pixels 100.

A horizontal scanning circuit, not illustrated, outputs count signals stored in the memories 155 of the columns by successively scanning the memories 155 of the columns. The count signals of the individual columns read from the vertical scanning are output to an outside of the imaging apparatus through an apparatus output unit, not illustrated.

Figure 2A:
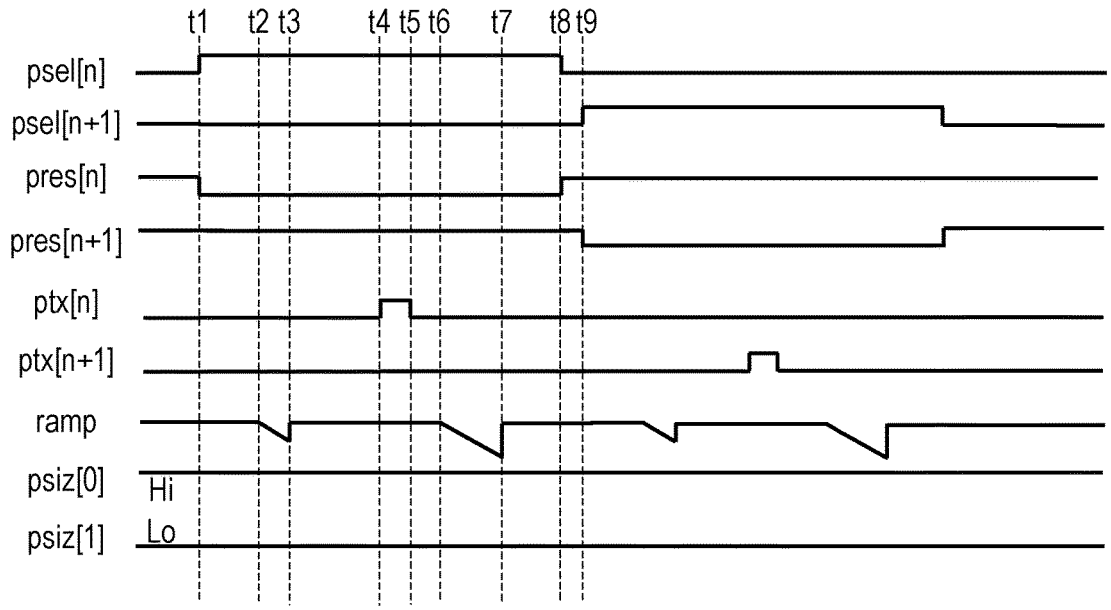
FIGS. 2A and 2B are diagrams illustrating operations of the imaging apparatus.
Figure 2B:
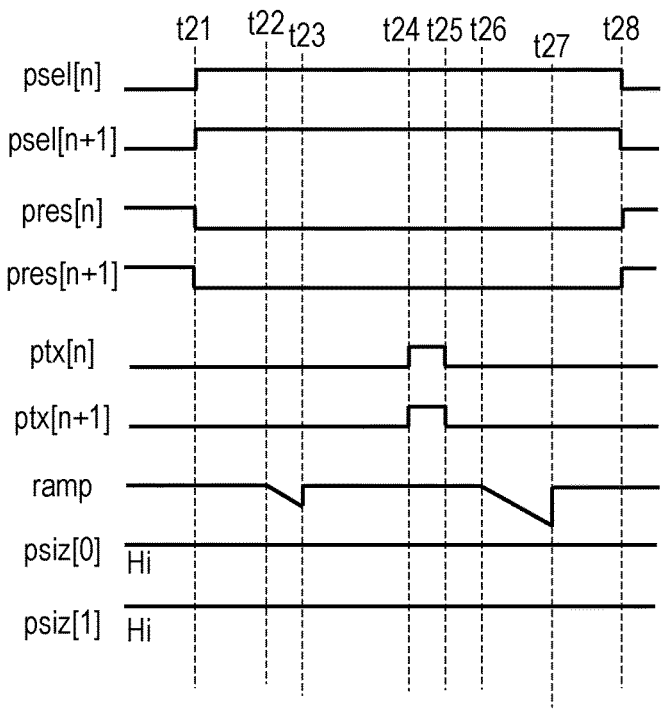

FIGS. 2A and 2B are diagrams illustrating operations performed by the imaging apparatus illustrated in FIG. 1. In FIGS. 2A and 2B, an operation of the pixel 100 in the n-th row and an operation of the pixel 100 in the (n+1)-th row in the imaging apparatus of FIG. 1 are illustrated. Signals illustrated in FIGS. 2A and 2B correspond to signals illustrated in FIG. 1. Furthermore, in FIGS. 2A and 2B, signals in a high level are represented by "Hi" and signals in a low level are represented by "Lo".

FIG. 2A is a diagram illustrating an operation of performing AD conversion on signals based on incident light which are read from the pixels 100 to the vertical signal line 107. On the other hand, FIG. 2B is a diagram illustrating an operation of performing AD conversion on mixture of signals supplied from the pixels 100 which is mixed in the vertical signal line 107. The operation in FIG. 2B suppresses the number of signals output from the imaging apparatus per one frame when compared with the operation in FIG. 2A. Specifically, the operation in FIG. 2A is performed when a still image is captured and the operation in FIG. 2B is performed when a moving image is captured.

First, the operation in FIG. 2A will be described.

At time point t1, the vertical scanning circuit 125 brings a signal pres[n] into a Lo level. Accordingly, the reset transistor 104 of the pixel 100 in the n-th row is turned off. Therefore, reset of the FD unit 103 of the pixel 100 in the n-th row is cancelled. The vertical scanning circuit 125 further brings a signal psel[n] supplied to the selection transistor 106 of the pixel 100 in the n-th row into a Hi level. The selection transistor 106 of the pixel 100 in the n-th row is turned on. By this, the amplification transistor 105 in the n-th row is electrically connected to the vertical signal line 107 through the selection transistor 106. Accordingly, the amplification transistor 105 of the pixel 100 in the n-th row becomes a first input node of a differential pair. Here, a noise signal mainly including a noise component is output to the vertical signal line 107. Hereinafter, this noise signal is referred to as an "N signal". The controller brings the signal psiz[0] into a Hi level and the signal psiz[1] into a Lo level. By this, the transistor 111 which is one of the plurality of transistors connected to the second input node of the differential pair is turned on.

A period of time from a time point t2 to a time point t3 is an AD conversion period for converting the N signal into a digital signal.

At the time point t2, the ramp signal supplying unit 165 starts change of a potential of the ramp signal ramp with time. Furthermore, the counter 160 which supplied the count signal to the memory 155 starts counting of a clock signal.

Thereafter, the value of the signal out is changed when the magnitude relationship between the potential of the ramp signal ramp and a potential of the N signal output to the vertical signal line 107 is reversed. When the value of the signal out is changed, the memory 155 stores the count signal at this time. The count signal stored in the memory 155 is a digital signal based on the N signal. The digital signal is referred to as a "digital N signal".

Thereafter, at the time point t3, the ramp signal supplying unit 165 terminates the change of the potential of the ramp signal ramp with time and resets the potential of the ramp signal ramp to an initial potential.

Subsequently, at a time point t4, the vertical scanning circuit 125 brings a signal ptx[n] into a Hi level. By this, the transfer transistor 102 of the pixel 100 in the n-th row is turned on. Therefore, transfer of a charge generated by the photodiode 101 to the control node of the amplification transistor 105 through the FD unit 103 is started. Thereafter, at a time point t5, the vertical scanning circuit 125 brings a signal ptx[n] into a Lo level. Accordingly, the transfer of the charge from the photodiode 101 to the amplification transistor 105 is terminated. A signal output from the amplification transistor 105 to the vertical signal line 107 at this time is referred to as an "S signal".

At a time point t6, the ramp signal supplying unit 165 starts change of the potential of the ramp signal ramp with time again. Furthermore, the counter 160 which supplies the count signal to the memory 155 starts counting of the clock signal.

Thereafter, the value of the signal out is changed when the magnitude relation between the potential of the ramp signal ramp and a potential of the S signal output to the vertical signal line 107 is reversed. When the value of the signal out is changed, the memory 155 stores the count signal at this time. The count signal stored in the memory 155 is a digital signal based on the S signal. The digital signal is referred to as a "digital S signal".

At a time point t7, the ramp signal supplying unit 165 terminates the change of the potential of the ramp signal ramp with time and resets the potential of the ramp signal ramp to an initial potential.

Thereafter, the vertical scanning circuit 125 successively reads the digital N signals and the digital S signals which are stored in the memories 155 of the individual columns from the memories 155 of the individual columns. The apparatus output unit obtains differences between the digital N signals and the digital S signals and outputs differential signals to an outside of the imaging apparatus.

At a time point t8, the vertical scanning circuit 125 brings the signal psel[n] into a Lo level. Furthermore, the vertical scanning circuit 125 brings the signal pres[n] into a Hi level and resets the FD unit 103 of the pixel 100 in the n-th row.

Thereafter, at a time point t9, the vertical scanning circuit 125 brings a signal psel[n+1] into a Hi level. Furthermore, the vertical scanning circuit 125 brings a signal pres[n+1] into a Lo level. An operation to be performed on the pixel 100 in the (n+1)-th row onwards is the same as that performed on the pixel 100 in the n-th row.

Next, the operation in FIG. 2B will be described.

At a time point t21, the vertical scanning circuit 125 brings the signal psel[n] and the signal psel[n+1] into a Hi level. By this, the amplification transistor 105 of the pixel 100 in the n-th row and the amplification transistor 105 of the pixel 100 in the (n+1)-th row are electrically connected to the vertical signal line 107 in common. Furthermore, the vertical scanning circuit 125 brings the signal pres[n] and the signal pres[n+1] into a Lo level. By this, a signal obtained by mixing the N signal of the pixel 100 in the n-th row and the N signal of the pixel 100 in the (n+1)-th row is output to the vertical signal line 107. The signal obtained by mixing the N signals is referred to as a "mixed N signal".

Furthermore, the control unit sets a signal psiz[0] and a signal psiz[1] as a Hi level.

As described above, in the operation of FIG. 2B, the amplification transistor 105 of the pixel 100 in the n-th row and the amplification transistor 105 of the pixel 100 in the (n+1)-th row are a first input node of a differential pair. Furthermore, both of the transistors 111 and 113 which are a plurality of transistors serving as a second input node of the differential pair are turned on. Furthermore, a sum of a channel width W of the amplification transistor 105 in the n-th row and a channel width W of the amplification transistor 105 in the (n+1)-th row is equal to a sum of a channel width W of the transistor 111 and a channel width of the transistor 113.

At a time point t22, the ramp signal supplying unit 165 starts change of a potential of the ramp signal ramp with time.

Operations of the output unit 150, the memory 155, and the counter 160 in a period from the time point t22 to a time point t24 are the same as those in a period from the time point t2 to the time point t4 of FIG. 2A described above. By this operation, the memory 155 stores a digital signal obtained by performing AD conversion on the mixed N signal. The digital signal is referred to as "digital mixed N signal".

At the time point t24, the vertical scanning circuit 125 brings the signal ptx[n] and the signal ptx[n+1] into a Hi level. Thereafter, at a time point t25, the vertical scanning circuit 125 brings the signal ptx[n] and the signal ptx[n+1] into a Lo level. By this, a signal obtained by mixing the S signal of the pixel 100 in the n-th row and the S signal of the pixel 100 in the (n+1)-th row is output to the vertical signal line 107. The signal obtained by mixing the S signals is referred to as a "mixed S signal".

At a time point t26, the ramp signal supplying unit 165 starts change of the potential of the ramp signal ramp with time.

Operations of the output unit 150, the memory 155, and the counter 160 in a period from the time point t26 to a time point t28 are the same as those in a period from the time point t6 to the time point t8 of FIG. 2A described above. By this operation, the memory 155 stores a digital signal obtained by performing AD conversion on the mixed S signal. The digital signal is referred to as a "digital mixed S signal".

Thereafter, the vertical scanning circuit 125 successively reads digital mixed N signals and digital mixed S signals which are stored in the memories 155 of the individual columns from the memories 155 of the individual columns. The apparatus output unit obtains differences between the digital N mixed signals and the digital mixed S signals and outputs differential signals to an outside of the imaging apparatus.

The operation of the imaging apparatus illustrated in FIG. 2A is a first operation. The operation of the imaging apparatus illustrated in FIG. 2B is a second operation. Specifically, in the first operation, at least one amplification transistor 105 (one amplification transistor in this embodiment), that is, a first number of application transistors, is in an ON state for a first period. Furthermore, among the plurality of transistors (the transistors 111 and 113), at least one transistor (one transistor in this embodiment), that is, a second number of transistors, is in an ON state for the first period. Furthermore, in the second operation, a number of amplification transistors 105 (two amplification transistors in this embodiment) corresponding to a number larger than the first number, that is, a third number of application transistors 105, are in an ON state for a second period. Furthermore, among the plurality of transistors (the transistors 111 and 113), a number of transistors (two transistors in this embodiment) corresponding to a number larger than the second number, that is, a fourth number of transistors, are in an ON state for the second period.

The imaging apparatus of this embodiment which is an example of a photoelectric conversion apparatus mixes signals output from the plurality of pixels 100 in the vertical signal line 107. Also in this case, in the imaging apparatus of this embodiment, a sum of the channel widths of the amplification transistors 105 of the plurality of pixels 100 in which ON states thereof overlap with one another is equal to a sum of the channel widths of differential transistors in which ON states thereof overlap with one another. In a general differential pair, even if the number of amplification transistors 105 in which ON states thereof overlap with one another is changed, the number of differential transistors which are in the ON states is constant. Therefore, symmetry of the differential pair is changed if the number of amplification transistors 105 in which ON states thereof overlap with one another is changed. Accordingly, there arises a problem in that accuracy of a signal output from the output unit 150 varies when the number of amplification transistors 105 in which ON states thereof overlap with one another is changed. In the imaging apparatus of this embodiment, the number of differential transistors in which ON states thereof overlap with one another is increased in accordance with increase of the number of amplification transistors 105 in which ON states thereof overlap with one another. By this, in the imaging apparatus of this embodiment, it is difficult to cause change of symmetry of the differential pair caused by change of the number of amplification transistors 105 in which ON states thereof overlap with one another when compared with the case of the general differential pair. Accordingly, the imaging apparatus of this embodiment effectively suppress variation of accuracy of the signal output from the output unit 150 which occurs in accordance with the change of the number of amplification transistors 105 in which ON states thereof overlap with one another. Note that, according to the imaging apparatus of this embodiment, a sum of the channel widths of the amplification transistors 105 of the plurality of pixels 100 in which ON states thereof overlap with one another is equal to a sum of the channel widths of differential transistors in which ON states thereof overlap with one another. However, the present invention is not limited to this configuration. Specifically, the number of differential transistors in which ON states thereof overlap with one another is increased in accordance with increase of the number of amplification transistors 105 in which ON states thereof overlap with one another. For example, the relationship among the first number, the second number, the third number, and the fourth number may be 1, 2, 2, and 3. Furthermore, the configuration in which the number of differential transistors which have the same channel width and which are to be turned on is controlled has been described in this embodiment. However, the present invention is not limited to this configuration, and the channel widths of the differential transistors are increased in accordance with increase of the number of amplification transistors 105 in which ON states thereof overlap with one another. For example, a plurality of differential transistors having different channel widths are prepared. Then one of the plurality of differential transistors which has a control node having a channel width which is close to (corresponds to) a sum of the channel widths of the amplification transistors 105 in which ON states thereof overlap with one another may be selected.

Note that, in this embodiment, the case where the potential of the ramp signal ramp is changed in a slope shape has been described as an example. Alternatively, the potential of the ramp signal ramp may be changed in a sawtooth waveform similarly to a ramp signal generated by a digital-analog converter (DAC) as another example.

Furthermore, in this embodiment, the case where the counter 160 supplies the count signal to the plurality of memories 155 in common has been described as an example. Alternatively, the imaging apparatus may include counters for counting a clock signal for individual columns as another example. In this case, the counters for the individual columns may start the count of a clock signal when the potential of the ramp signal ramp is changed with time, and stop the count of the clock signal when the value of the signal out output from the output unit 150 is changed.

Note that the output unit 150 includes the two switch transistors 112 and 114 in this embodiment. However, the output unit 150 at least includes the switch transistor 114. Specifically, the transistor 111 is in an ON state at all times, whereas the transistor 113 is in an OFF state in the operation in FIG. 2A and in an ON state in the operation in FIG. 2B. An operation of the transistor 113 while the switch transistor 114 is in an OFF state will now be described. The transistor 113 has a control node which receives a voltage supplied to a control node of the transistor 111 in common. Therefore, a voltage Vgs which is a voltage difference between one of main nodes of the transistor 113 which is electrically connected to the switch transistor 114 and the input node of the transistor 113 is larger than a threshold voltage Vth, and accordingly, an ON state is entered. Since the switch transistor 114 is in the OFF state, the main nodes of the transistor 113 have the same voltage. Therefore, current is not supplied between the main nodes of the transistor 113, and consequently, the transistor 113 is turned off. The transistor 113 which performs the operation described above may be substantially seen to be an OFF state since current is not supplied between the main nodes thereof.

However, a configuration in which both of the switch transistors 112 and 114 are disposed as described in this embodiment is preferable. This is because each of the pixels 100 includes the selection transistor 106, and if the switch transistors 112 and 114 having channel widths equal to that of the selection transistor 106 are disposed in the output unit 150, symmetry of the differential pair is improved when compared with the configuration in which the switch transistor 112 is omitted.

Note that, although the pixels 100 include the respective selection transistors 106 in this embodiment, the pixels 100 may not include the selection transistors 106. In this case, selection of the pixels 100 is performed by a setting of potentials of the control nodes of the amplification transistors 105. Specifically, as a power source voltage svdd supplied to the reset transistors 104, a power source voltage svdd1 which does not select the pixels 100 or a power source voltage svdd2 which selects the pixels 100 is selectively supplied, for example. The controller supplies the power source voltage svdd1 to the reset transistors 104 of non-selected pixels 100, and the vertical scanning circuit 125 brings the signal pres[n] into a Hi level. By this, the potentials of the control nodes of the amplification transistors 105 are based on the power source voltage svdd1, and the pixels 100 are brought to a non-selected state. On the other hand, when pixels 100 are to be selected, the controller supplies the power source voltage svdd2 to the reset transistors 104, and the vertical scanning circuit 125 brings the signal pres[n] into a Hi level. By this, the potential of the control nodes of the amplification transistors 105 are based on the power source voltage svdd2, and the pixels 100 are brought to a selected state. In this case, since the pixels 100 do not include the respective selection transistors 106, it is preferable that the output unit 150 does not include the switch transistor 112. More preferably, the output unit 150 does not include the switch transistors 112 and 114, and the control node of the transistor 111 and the control node of the transistor 113 are electrically separated from each other. The ramp signal ramp is supplied to the control node of the transistor 111, for example. Then, one of a fixed potential which turns the transistor 113 off and the ramp signal ramp supplied to the control node of the transistor 111 in common is selectively supplied to the control node of the transistor 113.

Note that, according to this embodiment, the sum of the channel widths W of the amplification transistors 105 of the pixels 100 is equal to the sum of the channel widths W of the transistors 111 and 113. Meanwhile, the effect of this embodiment may be attained in a case where a sum of gate widths of the amplification transistors 105 of the pixels 100 is the same as a sum of gate widths of the transistors 111 and 113 when compared with the case where the transistors 113 are not provided.

Note that, although the case where periods of time in which the signal psel supplied from the vertical scanning circuit 125 to the selection transistors 106 of the pixels 100 are the same in the operation of FIG. 2B has been described as an example in this embodiment, the present invention is not limited to this example. In the imaging apparatus of this embodiment, signals output from the amplification transistor 105 of the plurality of pixels 100 are mixed in the vertical signal line 107 before the AD conversion period from the time point t26 to the time point t27.

Moreover, in the operation illustrated in FIG. 2B, the periods of time in which the controller brings the signal psiz[0] and the signal psiz[1] into a Hi level are the same. However, the imaging apparatus of this embodiment is not limited to this example. The signal psiz[0] and the signal psiz[1] are in a Hi level at least during the AD conversion period from the time point t26 to the time point t27 in which the mixed S signal is converted into the digital signal.

In this embodiment, the imaging apparatus is illustrated as a photoelectric conversion apparatus. However, this embodiment is not limited to the imaging apparatus, and may be applied to a focus detection apparatus which detects a focal point using a phase difference, for example.

Second Embodiment

Points of an imaging apparatus which is an example of a photoelectric conversion apparatus which are different from the first embodiment will be mainly described.

The output unit 150 included in the imaging apparatus of the first embodiment operates as a comparison unit which compares signals output to the vertical signal line 107 with the ramp signal ramp. However, in a second embodiment, a case where an output unit operates as a voltage follower will be described as another example.

Figure 3:
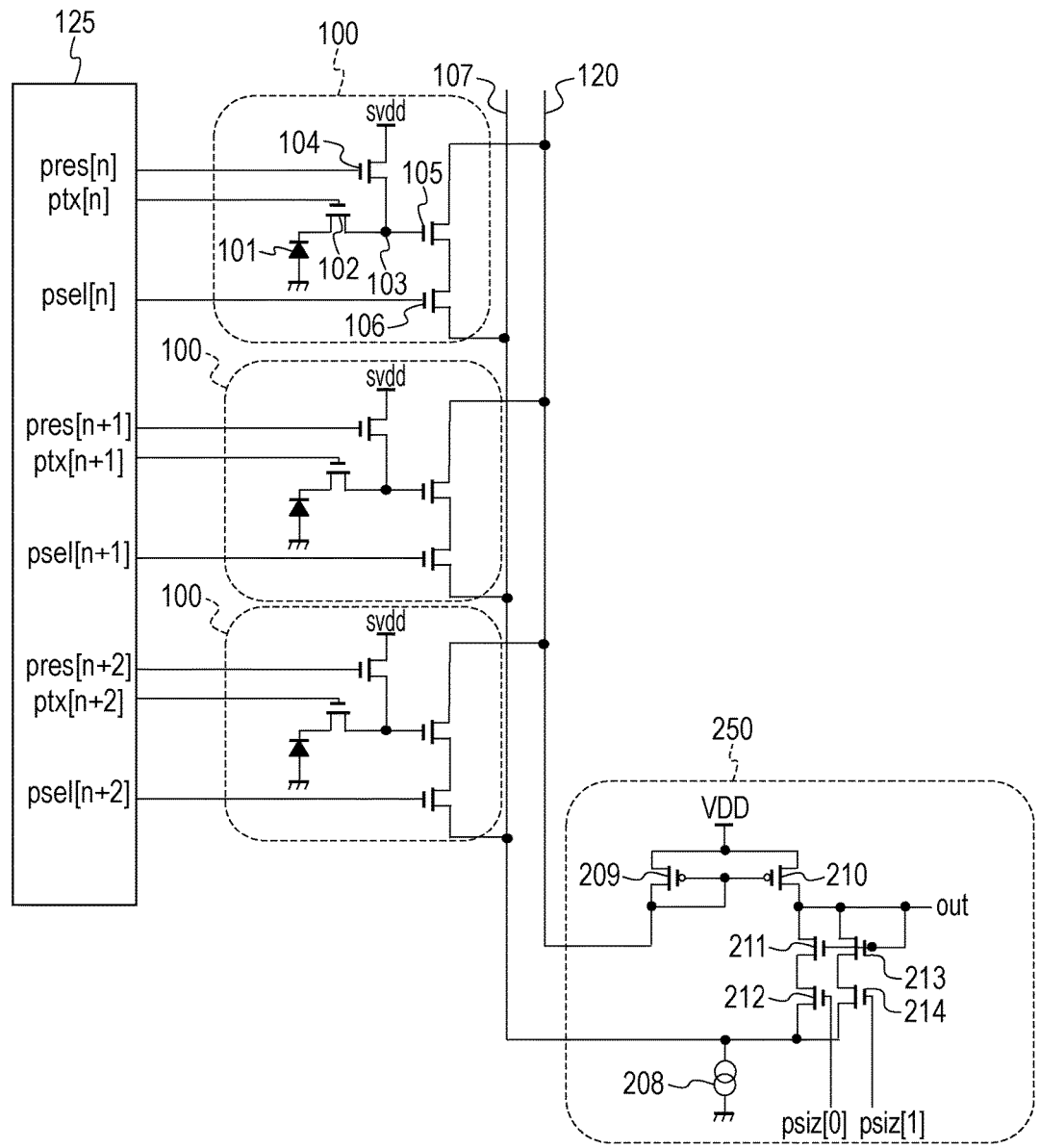
FIG. 3 is a diagram illustrating a configuration of an imaging apparatus.

FIG. 3 is a diagram illustrating a configuration of the imaging apparatus according to the second embodiment. In FIG. 3, components having functions the same as those included in the imaging apparatus illustrated in FIG. 1 are denoted by reference numerals the same as those used in FIG. 1.

An output unit 250 includes a current source 208, a transistor 209, a transistor 210, a transistor 211, a transistor 213, a switch transistor 212, and a switch transistor 214.

The transistors 211 and 213 are second input nodes of a differential pair. Each of the transistors 211 and 213 is a differential transistor which makes a differential pair with an amplification transistor 105. In this embodiment, channel widths W of the amplification transistor 105, the transistor 211, and the transistor 213 are the same. Furthermore, channel lengths L of the amplification transistor 105, the transistor 211, and the transistor 213 are the same. Specifically, channel ratios W/L of the amplification transistor 105, the transistor 211, and the transistor 213 are the same.

Moreover, channel widths W of a selection transistor 106, the switch transistor 212, and the switch transistor 214 are the same. Channel lengths L of the selection transistor 106, the switch transistor 212, and the switch transistor 214 are the same. Specifically, channel ratios W/L of the selection transistor 106, the switch transistor 212, and the switch transistor 214 are the same.

The transistors 209 and 210 and a power source voltage VDD constitute a current mirror circuit.

A controller outputs a signal psiz[0] to a control node of the switch transistor 212. The controller outputs a signal psiz[1] to a control node of the switch transistor 214.

In the output unit 150 of the first embodiment, the ramp signal ramp is supplied to the control node of the transistors 111 and 113. However, in the output unit 250 of this embodiment, control nodes of the transistor 211 and the transistor 213 are electrically connected to a node used when the output unit 250 outputs a signal out.

Operations of the imaging apparatus of this embodiment are the same as those of FIGS. 2A and 2B expected that the ramp signal ramp is input in the first embodiment.

As described above, as with the first embodiment, change of symmetry of a differential pair is suppressed also by using a different method for reading signals of the pixels 100 of the imaging apparatus.

Third Embodiment

Points of an imaging apparatus of a third embodiment which is an example of a photoelectric conversion apparatus which are different from the first embodiment will be mainly described.

In the imaging apparatus of the first embodiment, the sum of the channel widths of the amplification transistors 105 of the pixels 100 in which ON states thereof overlap with one another is equal to the sum of the channel widths of the differential transistors in which ON states thereof overlap with one another.

However, in this embodiment, a sum of channel widths of differential transistors in which ON states thereof overlap with one another is larger than a sum of channel widths of the amplification transistors 105 of pixels 100 in which ON states thereof overlap with one another.

In general, variation of threshold values Vth of transistors for individual transistors is increased as channel areas (channel width×channel length) of the transistors are reduced. Accordingly, in this embodiment, a channel area of differential transistors to be turned on is set to be larger than that of the amplification transistors 105. By this, the variation of the threshold values for individual transistors generated in the differential transistors may be reduced. Accordingly, the imaging apparatus of this embodiment may reduce degradation of accuracy of signals output from differential pairs.

Figure 4:
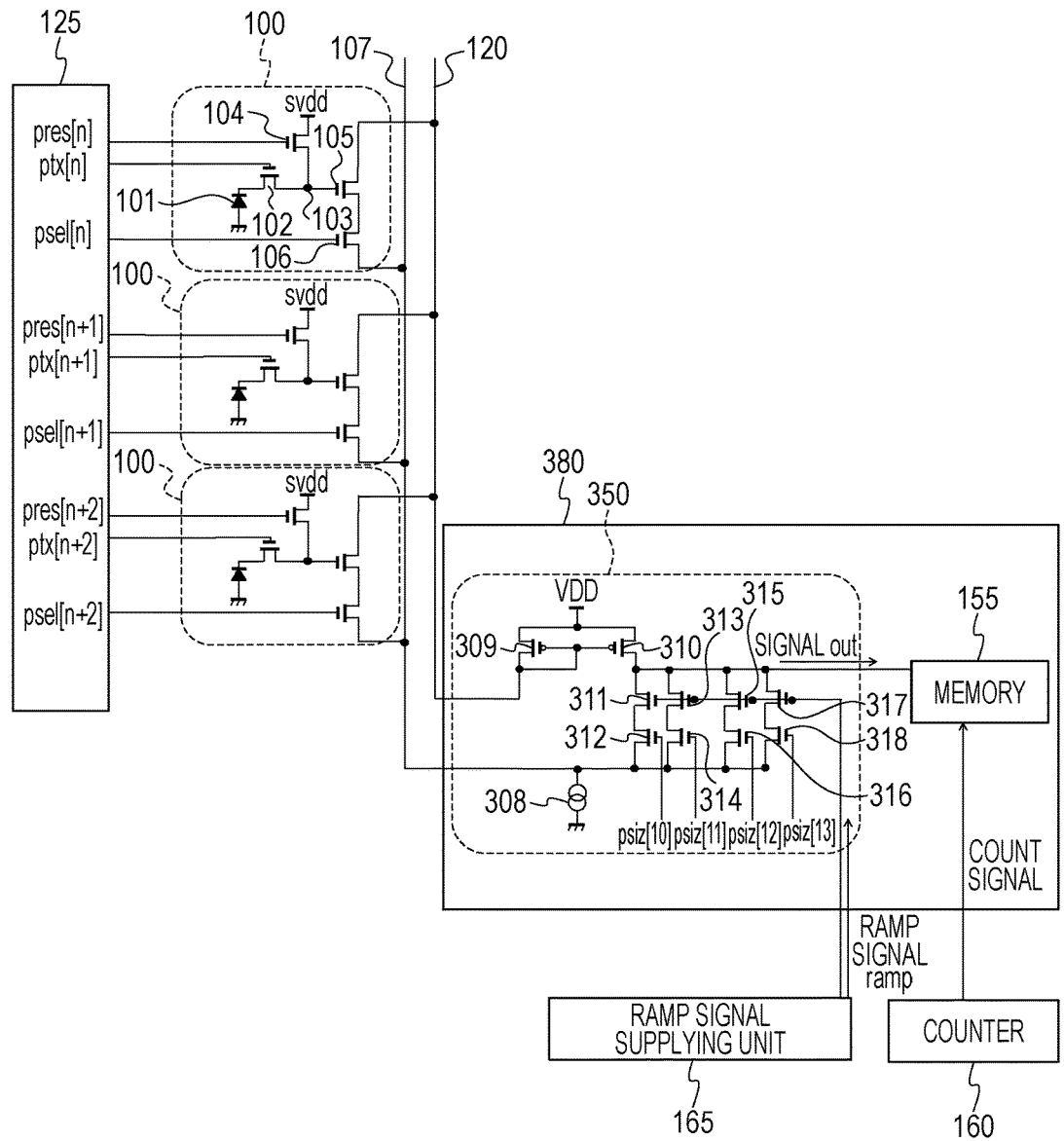
FIG. 4 is a diagram illustrating a configuration of an imaging apparatus.

FIG. 4 is a diagram illustrating a configuration of the imaging apparatus according to this embodiment. In FIG. 4, components having functions the same as those included in the imaging apparatus illustrated in FIG. 1 are denoted by reference numerals the same as those used in FIG. 1.

A column circuit unit 380 of the imaging apparatus of this embodiment includes an output unit 350. The output unit 350 includes a current source 308 and transistors 309 and 310. A source voltage VDD and the transistors 309 and 310 constitute a current mirror circuit. The output unit 350 further includes a transistor 311, a switch transistor 312, a transistor 313, a switch transistor 314, a transistor 315, a switch transistor 316, a transistor 317, and a switch transistor 318.

Control nodes of the transistors 311, 313, 315, and 317 correspond to second input nodes of a differential pair. Each of the transistors 311, 313, 315 and 317 is a differential transistor which makes the differential pair with the amplification transistor 105. In this embodiment, channel widths W of the amplification transistor 105 and the transistors 311, 313, 315, and 317 are the same.

Furthermore, channel lengths L of the amplification transistor 105 and the transistors 311, 313, 315, and 317 are the same. Specifically, channel ratios W/L of the amplification transistor 105 and the transistors 311, 313, 315, and 317 are the same.

Furthermore, in this embodiment, channel widths W of a selection transistor 106 and the switch transistors 312, 314, 316, and 318 are the same. Moreover, channel lengths L of the selection transistor 106 and the switch transistors 312, 314, 316, and 318 are the same. Specifically, channel ratios W/L of the selection transistor 106 and the switch transistors 312, 314, 316, and 318 are the same.

A controller outputs a signal psiz[10], a signal psiz[11], a signal psiz[12], and a signal psiz[13] to the switch transistors 312, 314, 316, and 318, respectively.

A ramp signal ramp is supplied to the control nodes of the transistors 311, 313, 315, and 317. Furthermore, first main nodes of the transistors 311, 313, 315, and 317 are electrically connected to an output node of the differential pair which outputs a signal output.

FIGS. 5A and 5B are diagrams illustrating operations performed by the imaging apparatus illustrated in FIG. 4.

FIG. 5A is a diagram illustrating an operation of performing AD conversion on signals based on incident light which are read from the plurality of pixels 100 to the vertical signal line 107 as described above with reference to FIG. 2A. On the other hand, FIG. 5B is a diagram illustrating an operation of performing AD conversion on mixture of signals supplied from the plurality of pixels 100 which is mixed in the vertical signal line 107 as described with reference to FIG. 2B.

In the operation illustrated in FIG. 5A, the controller brings the signal psiz[10] and the signal psiz[11] into a Hi level and brings the signal psiz[12] and the signal psiz[13] into a Lo level. By this, both of the transistors 311 and 313 among the plurality of transistors serving as the second input node of the differential pair are turned on. The transistors 311 and 313 function as one differential transistor having a channel area which is twice as large as a channel area of the transistor 311 or the transistor 313. Accordingly, in the operation in FIG. 5A, a sum of the channel areas of the transistors 311 and 313 which are a second input node of the differential pair and in which ON states thereof overlap with each other is larger than the channel area of the amplification transistor 105 which is a first input node of the differential pair.

In the operation illustrated in FIG. 5B, the controller brings the signal psiz[10], the signal psiz[11], the signal psiz[12], and the signal psiz[13] into a Hi level. By this, all the plurality of transistors 311, 313, 315 and 317 serving as the second input node of the differential pair are turned on. Accordingly, a sum of channel areas of the differential transistors which are a second input node of a differential pair is larger than a sum of channel areas of the two amplification transistor 105 which are a first input node of the differential pair.

An operation of the imaging apparatus illustrated in FIG. 5A is a first operation. An operation of the imaging apparatus illustrated in FIG. 5B is a second operation. Specifically, in the first operation, at least one amplification transistor 105 (one amplification transistor in this embodiment), that is, a first number of application transistors, is in an ON state for a first period. Furthermore, among the plurality of transistors (the transistors 311, 313, 315, and 317), at least one transistor (two transistors in this embodiment), that is, a second number of transistors, are in an ON state for the first period. Moreover, in the second operation, a number of amplification transistors 105 (two amplification transistors in this embodiment) corresponding to a third number of application transistors 105, are in an ON state for a second period. Furthermore, among the plurality of transistors (the transistors 311, 313, 315, and 317), transistors corresponding to a fourth number (four transistors in this embodiment) are in an ON state for the second period.

According to the imaging apparatus of the first embodiment, a sum of the channel areas of the amplification transistors 105 which are the first input node of the differential pair and in which ON states thereof overlap with one another is equal to a sum of the channel areas of the differential transistors which are the second input node of the differential pair and in which an ON states thereof overlap with one another. On the other hand, according to the imaging apparatus of this embodiment, since a sum of the channel areas of the differential transistors which are the second input node and in which ON states thereof overlap with one another is larger than that of the amplification transistors 105 which are the first input node of the differential pair and in which ON states thereof overlap with one another, the variation of the threshold values Vth for individual transistors may be reduced when compared with the imaging apparatus of the first embodiment.

Note that the imaging apparatus of the first embodiment or the imaging apparatus of this embodiment may be selectively used depending on characteristics required for an imaging apparatus. For example, in an imaging apparatus in which reduction of an area of the output unit 150 is required due to increase of the number of pixels, the output unit 150 may be replaced by the output unit 350 of this embodiment so that variation of the threshold values Vth caused by reduction of sizes of transistors is reduced. On the other hand, in a case where improvement of symmetry of a differential pair is required, the output unit 150 of the first embodiment is employed.

Fourth Embodiment

Points of an imaging apparatus of a fourth embodiment which are different from the first embodiment will be mainly described.

In the imaging apparatus of this embodiment, a differential transistor which constitutes a differential pair is disposed on a pixel region.

Figure 6:
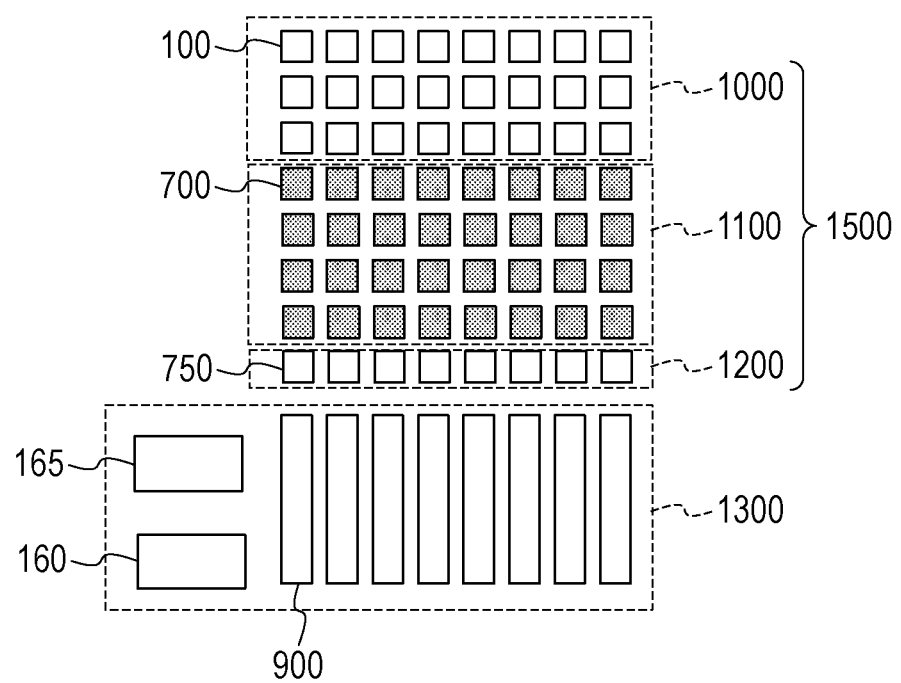
FIG. 6 is a diagram illustrating a configuration of an imaging apparatus.

FIG. 6 is a diagram illustrating a configuration of the imaging apparatus according to this embodiment.

The imaging apparatus of this embodiment includes an effective pixel region 1000 including a plurality of pixels 100, a ramp pixel region 1100 including a plurality of ramp pixels 700 which receive a ramp signal ramp, and a reference pixel region 1200 including a plurality of reference pixels 750. A pixel region 1500 includes the effective pixel region 1000, the ramp pixel region 1100, and the reference pixel region 1200. The imaging apparatus further includes a peripheral circuit region 1300 including a plurality of column circuit units 900. Furthermore, the peripheral circuit region 1300 includes a counter 160 and a ramp signal supplying unit 165. The pixel region 1500 and the peripheral circuit region 1300 are disposed in different active regions.

Figure 7:
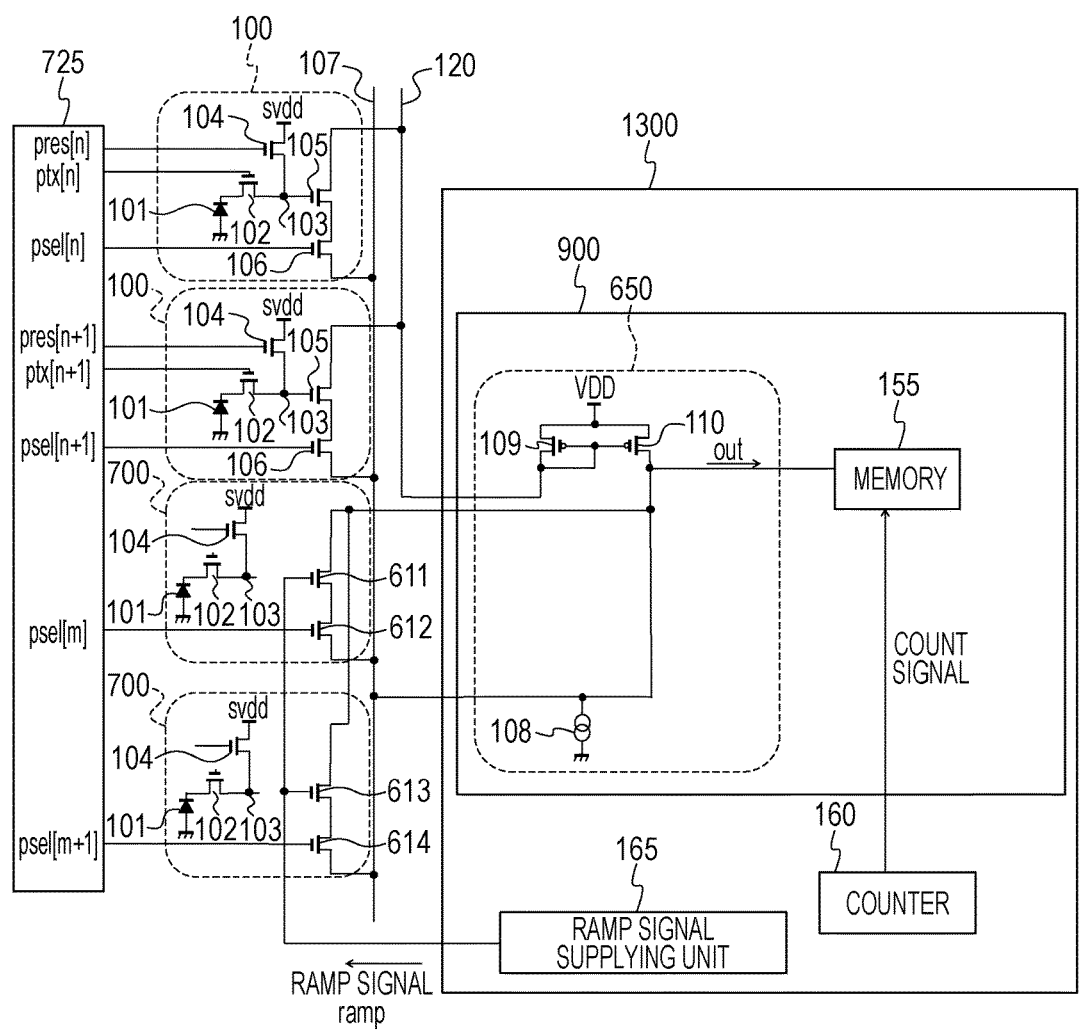
FIG. 7 is a diagram illustrating a configuration of the imaging apparatus.

FIG. 7 is a diagram illustrating configurations of the pixels 100, the ramp pixels 700, and the row circuit units 900 of the imaging apparatus illustrated in FIG. 6 in detail. In FIG. 7, components having functions the same as those included in the imaging apparatus illustrated in FIG. 1 are denoted by reference numerals the same as those used in FIG. 1.

Each of the ramp pixels 700 includes, as with each of the pixels 100, a photodiode 101, a transfer transistor 102, and a reset transistor 104. Furthermore, each of the ramp pixels 700 in an m-the row includes a transistor 611 and a switch transistor 612. A ramp signal ramp is supplied from the ramp signal supplying unit 165 to a control node of the transistor 611. Furthermore, a signal psel[m] is supplied from a vertical scanning circuit 725 to a control node the switch transistor 612. Moreover, each of the ramp pixels 700 in an (m+1)-th row includes a transistor 613 and a switch transistor 614. The ramp signal ramp which is shared by the transistor 611 is supplied from the ramp signal supplying unit 165 to a control node of the transistor 613.

Channel widths and channel lengths of the transistors 611 and 613 included in the ramp pixels 700 are the same as channel widths and channel lengths of amplification transistors 105. Furthermore, channel widths and channel lengths of the switch transistors 612 and 614 included in the ramp pixels 700 are the same as channel widths and channel lengths of selection transistors 106. Furthermore, although not illustrated in FIG. 7, layout of the plurality of transistors and the photodiode 101 included in each of the ramp pixels 700 is the same as layout of the plurality of transistors and the photodiode 101 included in each of the pixels 100.

In the operation of the imaging apparatus of this embodiment, the signal psiz[0] and the signal psiz[1] in the operations illustrated in FIGS. 2A and 2B are replaced by a signal psel[m] and a signal psel[m+1], respectively.

Note that, in this embodiment, layout of the ramp pixels 700 is the same as that of the pixels 100. However, each of the ramp pixels 700 at least includes the transistor 611 or the transistor 613. Note that it is preferable that layout of the plurality of transistors and the photodiode 101 included in each of the ramp pixels 700 is the same as layout of the plurality of transistors and the photodiode 101 included in each of the pixels 100. This is because a noise component included in a signal output from the amplification transistor 105 serving as a first input node of a differential pair is substantially the same as a noise component included in a signal output from a differential transistor serving as a second input node of the differential pair. Accordingly, since the amplification transistor 105 and the differential transistor constitute the differential pair, the noise component of the amplification transistor 105 and the noise component of the differential transistor may be subtracted. Consequently, the imaging apparatus of this embodiment may suppress influence of the noise of the amplification transistor 105 and the differential transistor on a signal out which is output from the output unit 650.

Furthermore, the imaging apparatus of this embodiment includes the reference pixel region 1200 in a portion between the ramp pixel region 1100 and the peripheral circuit region 1300. It is likely that manufacturing variation of individual pixels is increased in an end portion of the pixel region 1500 when compared with a center portion of the pixel region 1500. This manufacturing variation causes variation of threshold voltages Vth of the transistors. Therefore, it is preferable that the reference pixel region 1200 is disposed between the ramp pixel region 1100 and the peripheral circuit region 1300 so that the ramp pixel region 1100 is disposed more closely to the center portion of the pixel region 1500. Note that each of the reference pixels 750 included in the reference pixel region 1200 may or may not include a photodiode. In a case where each of the reference pixels 750 is a dummy pixel which does not include a photodiode, each of the reference pixels 750 includes the amplification transistor 105 and the selection transistor 106. Accordingly, noise components included in signals output from the amplification transistors 105 and the selection transistors 106 may be detected from signals output from the dummy pixels. On the other hand, in a case where each of the reference pixels 750 includes a photodiode, each of the reference pixels 750 is an optical black pixel which shields light of the photodiode. A configuration of the optical black pixels is the same as that of the pixels 100. Noise components of signals output from the pixels 100 may be detected from signals output from the optical black pixels.

Note that the imaging apparatus of this embodiment may be modified similarly to the imaging apparatuses according to the second and third embodiments.

Fifth Embodiment

Points of an imaging apparatus of a fifth embodiment which is an example of a photoelectric conversion apparatus which are different from the first embodiment will be mainly described.

Figure 8:
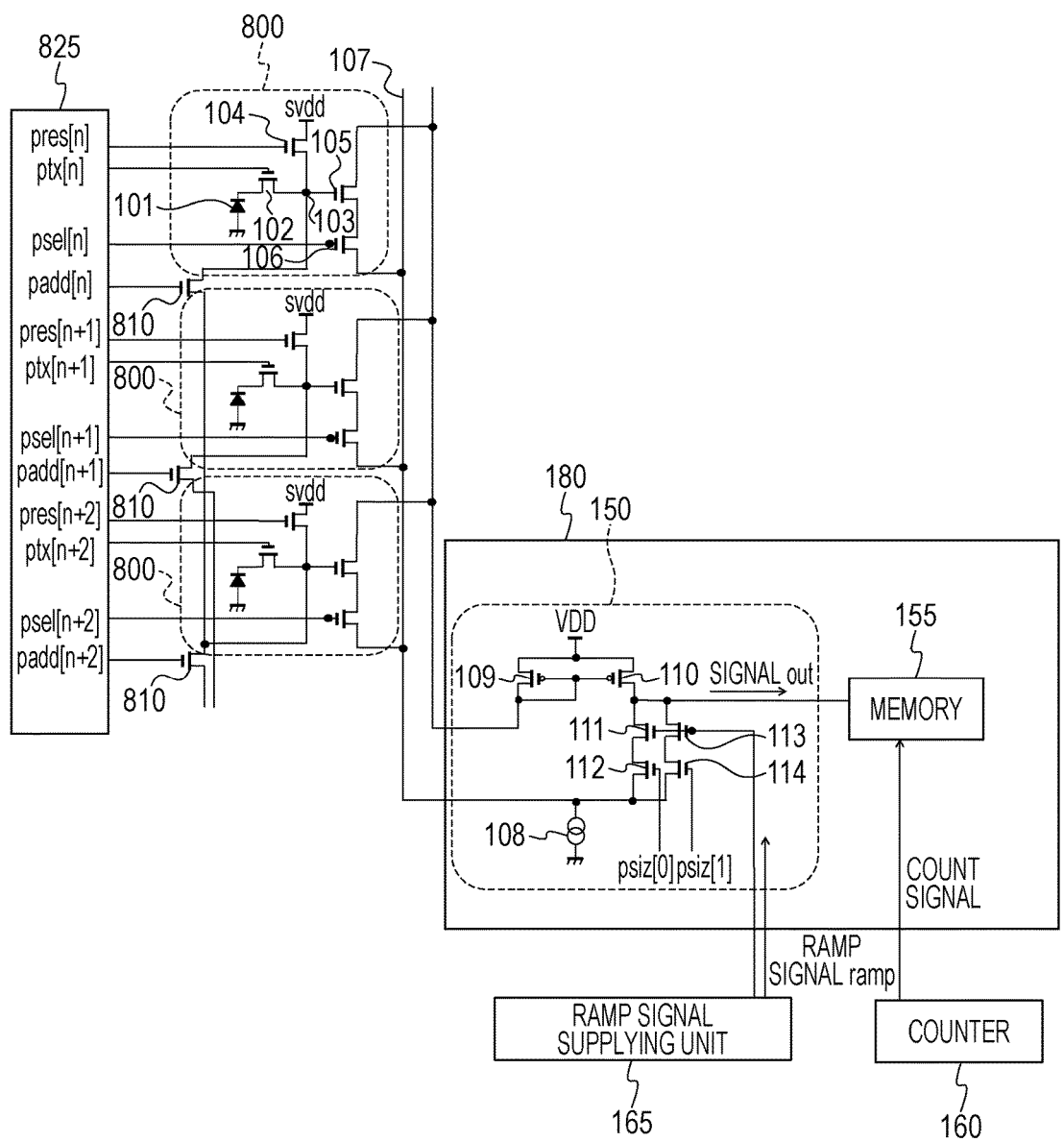
FIG. 8 is a diagram illustrating a configuration of an imaging apparatus.

FIG. 8 is a diagram illustrating a configuration of an imaging apparatus according to this embodiment. In FIG. 8, components having functions the same as those included in the imaging apparatus illustrated in FIG. 1 are denoted by reference numerals the same as those used in FIG. 1.

The imaging apparatus of this embodiment includes switch transistors 810 used to electrically connect FD units 103 of a plurality of pixels 800 to one another. A signal padd is supplied from a vertical scanning circuit 825 to control nodes the switch transistors 810. The switch transistors 810 are third switches.

An operation, performed by the imaging apparatus illustrated in FIG. 8, of reading signals from the plurality of pixels 800 to a vertical signal line 107 is the same as that illustrated in FIG. 2A. In this case, the vertical scanning circuit 825 brings the signal padd into a Lo level for an entire period of the operation illustrated in FIG. 2A.

Figure 9:
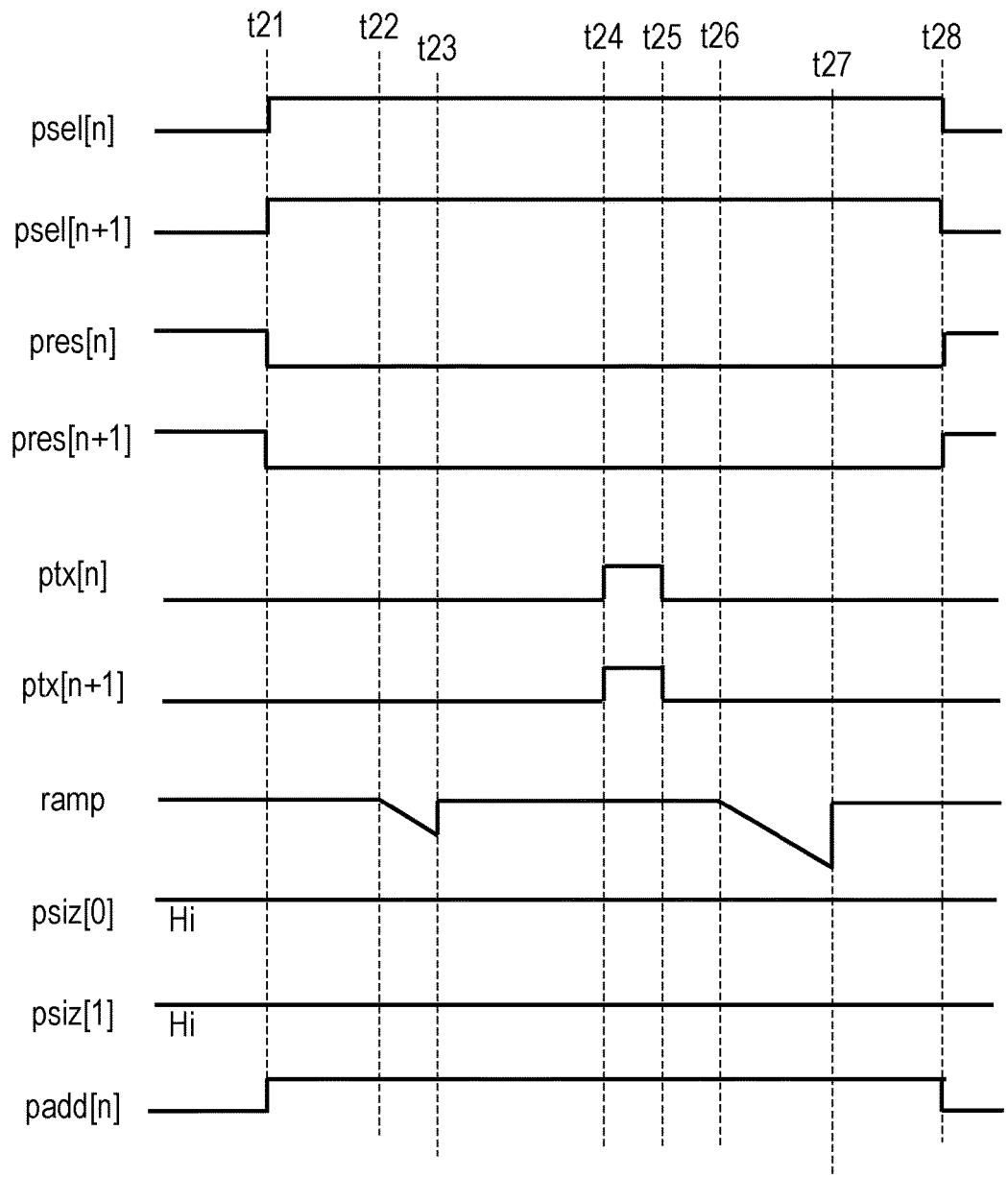
FIG. 9 is a diagram illustrating an operation of the imaging apparatus.

FIG. 9 is a diagram illustrating an operation performed when signals of a plurality of the pixels 800 are read as a single signal. The operation in FIG. 9 is different from that illustrated in FIG. 2B in that the vertical scanning circuit 825 brings a signal padd[n] into a Hi level for a period of time in which the vertical scanning circuit 825 brings a signal psel[n] into a Hi level.

When the signal padd[n] is brought into the Hi level, the switch transistor 810 which is used to electrically connect the FD unit 103 of the pixel 800 in an n-th row to the FD unit 103 of the pixel 800 in an (n+1)-th row is turned on. Accordingly, a charge of the FD unit 103 of the pixel 800 in the n-th row and a charge of the FD unit 103 of the pixel 800 in the (n+1)-th are mixed. Consequently, in the operation illustrated in FIG. 9, signals of the two pixels 800 are read to the vertical signal line 107 as a single signal.

In the operation of FIG. 2B, the amplification transistor 105 of the pixel 100 in the n-th row and the amplification transistor 105 of the pixel 100 in the (n+1)-th row output different signals based on different potentials of the FD units 103. On the other hand, in the imaging apparatus of this embodiment, the amplification transistor 105 of the pixel 100 in the n-th row and the amplification transistor 105 of the pixel 100 in the (n+1)-th row output signals based on the same potential of the FD units 103.

Also in the imaging apparatus of this embodiment, in a case where signals of the plurality of pixels 800 are read to the vertical signal line 107 at once, all the amplification transistors 105 of the plurality of pixels 800 are in ON states. Also in this case, as with the first embodiment, the transistors 111 and 113 are turned on. By this, the effect of the first embodiment may be also obtained in the imaging apparatus of this embodiment.

Note that the imaging apparatus of this embodiment may be modified similarly to the imaging apparatus according to the second to fourth embodiments.

Sixth Embodiment

Figure 10:
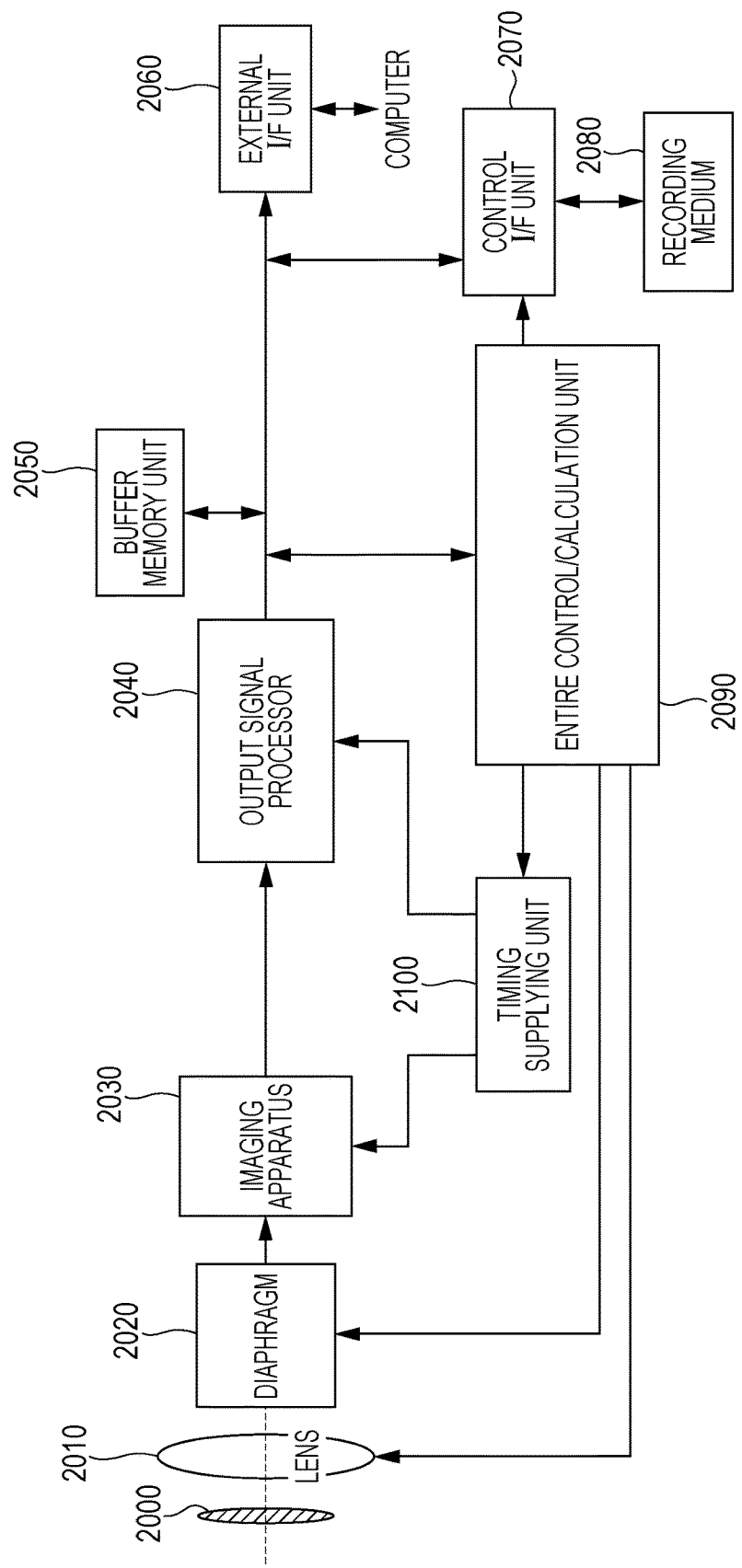
FIG. 10 is a diagram illustrating a configuration of an imaging system.

A case where the imaging apparatuses according to the first to fifth embodiments are employed in an imaging system will be described as a sixth embodiment. Examples of the imaging system include a digital still camera, a digital camcorder, and a surveillance camera. FIG. 10 is a diagram schematically illustrating a case where the imaging apparatus is applied to a digital still camera as an example of the imaging system.

The imaging system illustrated in FIG. 10 includes a barrier 2000 for lens protection, a lens 2010 used to form an optical image of an object on an imaging apparatus 2030, and a diaphragm 2020 used to change an amount of light which passes through the lens 2010. The lens 2010 and the diaphragm 2020 constitute an optical system which collects light into the imaging apparatus 2030. Furthermore, the imaging system illustrated in FIG. 10 includes an output signal processor 2040 which performs a process on a signal output from the imaging apparatus 2030 so as to generate an image.

Moreover, the imaging system illustrated in FIG. 10 includes a buffer memory unit 2050 which temporarily stores imaging data, an external interface unit 2060 which is used to communicate with external computers and the like, and a control interface unit 2070 used to perform recording or reading on a recording medium. The imaging system further includes a detachable recording medium 2080, such as a semiconductor memory, used to record or read imaging data and an entire control/calculation unit 2090 which controls various calculations and the entire digital still camera. The imaging system further includes the imaging apparatus 2030, the output signal processor 2040, and a timing supplying unit 2100 which outputs various timing signals. Here, the timing signals and the like may be externally input and the imaging system at least includes the imaging apparatus 2030 and the output signal processor 2040 which processes a signal output from the imaging apparatus 2030.

In this way, the imaging apparatuses according to the first to fifth embodiments are applicable to the imaging system.

Note that the relationships between an amplification transistor and a differential transistor in terms of a channel width, a channel length, and a channel area have been described in this specification. However, a channel width, a channel length, and a channel area of a transistor may be actually seen to be a gate width, a gate length, and a gate area, respectively.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-065246, filed Mar. 26, 2015, which is hereby incorporated by reference herein in its entirety.

What is claimed is:

1. A photoelectric conversion apparatus comprising:
   a plurality of pixels each including a photoelectric conversion unit configured to generate a charge based on an incident light and an amplification transistor having a control node configured to receive the charge and to serve as a first input node of a differential pair; and
   a plurality of transistors having respective control nodes configured to receive a common potential,
   wherein an operation of setting the control nodes of the plurality of transistors as a second input node of the differential pair while the plurality of transistors are in ON states and an operation of setting the control node of a part of the plurality of transistors as a second input node while the part of the plurality of transistors is in an ON state, are switched from one to another.

2. The photoelectric conversion apparatus according to claim 1, further comprising:
   a switch configured to perform switching between the operation of setting the control nodes of the plurality of transistors as a second input node of the differential pair while the plurality of transistors are in ON states and the operation of setting the control node of the part of the plurality of transistors as a second input node while the part of the plurality of transistors is in an ON state.

3. The photoelectric conversion apparatus according to claim 2, further comprising:
a current source,
wherein each of the plurality of pixels further includes a selection transistor,
the switch is a switch transistor,
the current source and the amplification transistor are electrically connected to each other through the selection transistor,
the current source and one of the plurality of transistors are electrically connected to each other through the switch transistor, and
a gate width of the selection transistor and a gate width of the switch transistor are the same as each other.

4. A photoelectric conversion apparatus comprising:
a plurality of pixels each including a photoelectric conversion unit configured to generate a charge based on incident light, an amplification transistor having a node connected to the photoelectric conversion unit, and a selection transistor;
a plurality of transistors having respective control nodes configured to receive a common potential;
a switch; and
a current source,
wherein the amplification transistor, the selection transistor, the plurality of transistors, the switch, a power source voltage node, and the current source form a differential pair, and the differential pair has a first electric path and a second electric path between the power source voltage node and the current source,
in the first electric path, the selection transistor is disposed between the current source and the amplification transistor, and
in the second electric path, the switch is disposed between the current source and one of the plurality of transistors.

5. The photoelectric conversion apparatus according to claim 2, further comprising:
a current mirror circuit; and
a second switch,
wherein the current mirror circuit is electrically connected to first main nodes of the plurality of transistors and the amplification transistor,
the switch is electrically connected to a second main node of one of the plurality of transistors, and
the second switch is electrically connected to a second main node of the other of the plurality of transistors.

6. The photoelectric conversion apparatus according to claim 4, further comprising:
a current mirror circuit; and
a second switch,
wherein the current mirror circuit is electrically connected to first main nodes of the plurality of transistors and the amplification transistor,
the switch is electrically connected to a second main node of one of the plurality of transistors, and
the second switch is electrically connected to a second main node of the other of the plurality of transistors.

7. The photoelectric conversion apparatus according to claim 1, wherein gate widths of the amplification transistors included in the plurality of pixels and gate width of the plurality of transistors are same as each other.

8. The photoelectric conversion apparatus according to claim 4, wherein gate widths of the amplification transistors included in the plurality of pixels and gate width of transistors are the same as each other.

9. The photoelectric conversion apparatus according to claim 1, wherein the common potential is a potential of an output node of the differential pair.

10. The photoelectric conversion apparatus according to claim 1, wherein
the common potential is a ramp signal,
the photoelectric conversion apparatus further includes a counter configured to generate and output a count signal obtained by counting a clock signal, and a memory configured to receive the count signal from the counter,
the differential pair outputs a comparison result signal indicating a result of comparison between the ramp signal and the signal output from the amplification transistor, and
the memory stores the count signal when a value of the comparison result signal is changed.

11. The photoelectric conversion apparatus according to claim 10, further comprising:
a plurality of ramp pixels each including a plurality of transistors and outputs the ramp signal,
wherein each of the ramp pixels further includes a photoelectric conversion unit and a current mirror circuit electrically connected to the amplification transistor and the plurality of transistors,
the photoelectric conversion apparatus includes a pixel region and a peripheral circuit region in different active regions,
the pixel region includes an effective pixel region including the plurality of pixels, a ramp pixel region including the plurality of ramp pixels, and a reference pixel region including reference pixels configured to output only signals which are not based on incident light,
the reference pixel region is disposed between the ramp pixel region and the peripheral circuit region, and
the peripheral circuit region includes the current mirror circuit.

12. The photoelectric conversion apparatus according to claim 11, further comprising:
a current mirror circuit electrically connected to the amplification transistor and the plurality of transistors,
wherein the photoelectric conversion apparatus includes the pixel region and the peripheral circuit region in different active regions,
the pixel region includes the effective pixel region including the plurality of pixels and the ramp pixel region including the plurality of ramp pixels, and
the peripheral circuit region includes the current mirror circuit.

13. The photoelectric conversion apparatus according to claim 1, wherein
the plurality of pixels include
respective floating diffusion units configured to store the charges, and
respective third switches used to electrically connect the floating diffusion units included in the plurality of pixels to one another, and
in an operation of setting the control nodes of the plurality of transistors as a second input node of the differential pair while the plurality of transistors are in ON states, all the amplification transistors of the plurality of pixels are brought into ON states while the third switches are in OFF states.

14. An imaging system comprising:
the photoelectric conversion apparatus according to claim 1; and
a signal processor configured to generate an image using a signal output from the photoelectric conversion apparatus.

15. An imaging system comprising:
the photoelectric conversion apparatus according to claim 4; and
a signal processor configured to generate an image using a signal output from the photoelectric conversion apparatus.

16. A method for driving a photoelectric conversion apparatus including a plurality of pixels each including a photoelectric conversion unit configured to generate a charge and an amplification transistor having a control node configured to receive the charge and to serve as a first input node of a differential pair, and a plurality of transistors having respective control nodes which receive a potential in common, wherein
in a first operation,
among the amplification transistors included in the plurality of pixels, at least one amplification transistor, that is, a first number of amplification transistors, is in an ON state for a first period, and
among the plurality of transistors, at least one transistor, that is, a second number of transistors, is in an ON state for the first period and is set as a second input node of the differential pair, and
in a second operation,
among the amplification transistors included in the plurality of pixels, a number of amplification transistors corresponding to a number larger than the first number, that is, a third number of application transistors, are in ON states for a second period, and
among the plurality of transistors, a number of transistors corresponding to a number larger than the second number, that is, a fourth number of transistors, are in ON states for the second period and are set as the second input node of the differential pair.

17. The method for driving the photoelectric conversion apparatus according to claim 16, wherein the first number is equal to the second number and the third number is equal to the fourth number.

18. A photoelectric conversion apparatus comprising:
a plurality of pixels each including a photoelectric conversion unit configured to generate a charge based on incident light and an amplification transistor having a control node configured to receive the charge and to serve as a first input node of a differential pair;
a transistor having a control node serving as a second input node of the differential pair;
a counter configured to generate and output a count signal obtained by counting a clock signal; and
a memory configured to receive the count signal from the counter,
wherein the amplification transistors of the plurality of pixels are brought into ON states, and
digital signals corresponding to the charges of the plurality of pixels are generated in accordance with outputs of the differential pairs,
wherein a ramp signal ramp is supplied to a control node of the transistor,
the differential pair outputs, to the memory, a comparison result signal indicating a result of comparison between the ramp signal and signals output from the amplification transistors which are simultaneously in ON states and which are included in the plurality of pixels, and
the memory stores the count signal when a value of the comparison result signal is changed.

19. An imaging system comprising:
the photoelectric conversion apparatus according to claim 18;
a signal processor configured to generate an image using a signal output from the photoelectric conversion apparatus.

* * * * *